United States Patent [19]

Graeber

[11] Patent Number: 4,841,126

[45] Date of Patent: Jun. 20, 1989

[54] ROTARY TABLE WIRE EDM MACHINE

[75] Inventor: Richard N. Graeber, Farmington Hills, Mich.

[73] Assignee: McWilliams Machinery Sales, Division of Bridgeport Machines Inc., Farmington Hills, Mich.

[21] Appl. No.: 138,390

[22] Filed: Dec. 28, 1987

[51] Int. Cl.⁴ .................... B23H 1/00; B23H 11/00
[52] U.S. Cl. ................. 219/69.2; 204/297 R; 219/69.17
[58] Field of Search ............ 219/69 V, 69 R, 69 W, 219/69 G, 69 C, 69 M; 204/224 M, 297 R

[56] References Cited

U.S. PATENT DOCUMENTS

| | | | |
|---|---|---|---|
| 3,049,032 | 8/1962 | Schabot | 269/297 |
| 3,272,732 | 9/1966 | Faulkner | 204/297 R |
| 3,461,059 | 8/1969 | Krueger | 204/297 R |
| 3,610,864 | 10/1971 | Kholodnov | 219/69 W |
| 3,664,947 | 5/1972 | Bass | 204/297 R |
| 3,731,044 | 5/1973 | Ullmann et al. | 219/69 W |
| 3,975,608 | 8/1976 | Ullmann et al. | 219/69 G |
| 4,029,929 | 6/1977 | Rietveld | 219/69 W |

FOREIGN PATENT DOCUMENTS 19638  2/1984  Japan ................. 219/69 C
169726 9/1984  Japan ................. 219/69 D Primary Examiner—A. D. Pellinen
Assistant Examiner—Geoffrey S. Evans
Attorney, Agent, or Firm—Spencer & Frank

[57] ABSTRACT

A method and apparatus control relative movement between an electrode of an EDM machine and a workpiece. The method provides for positioning each point of a path of relative movement between the electrode and the workpiece by the distance of the point from an axis of rotation, rotating the workpiece, positioning the point also by an angle through which the workpiece is rotated, memorizing the position of each point of the path, and repeating the steps of positioning the points. The apparatus includes a rotatable work table driven by a servo motor and encoder to rotate the table to a desired angle. A device for polarizing the workpiece is provided to avoid interference with the rotation of the table on which the workpiece is mounted. The apparatus further includes machinery for translating the work table or the electrode along an axis that intersects the axis of rotation for the table. Splash guards are provided for protecting the motor and encoder, the work table and the connections between them from the splashing of a liquid dielectric used in the electro-eroding process.

17 Claims, 3 Drawing Sheets

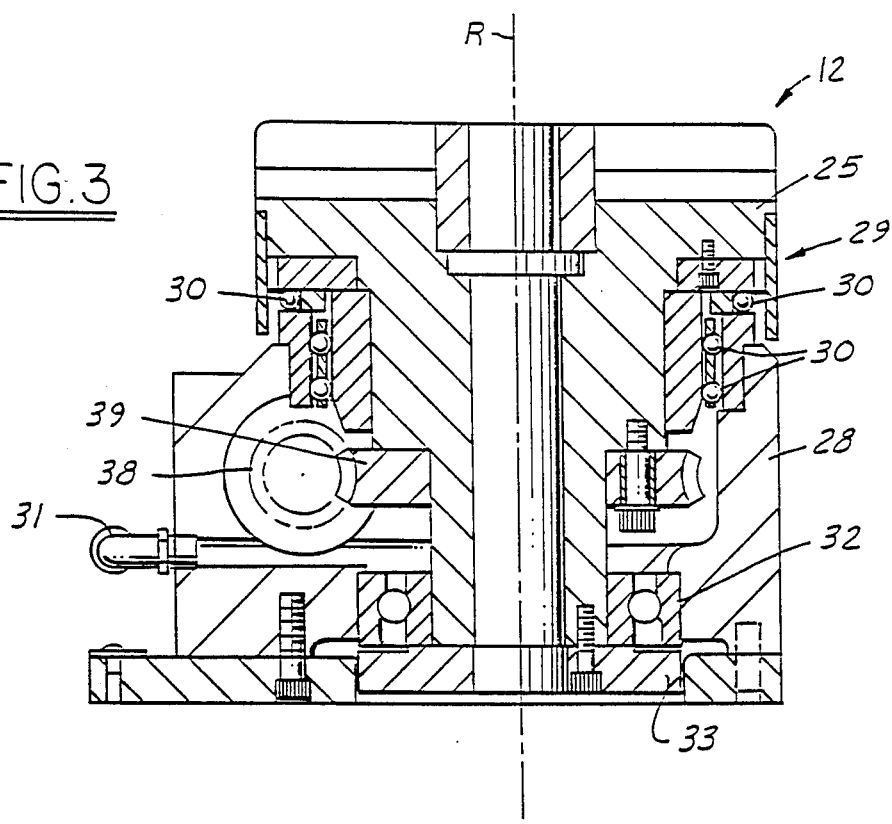
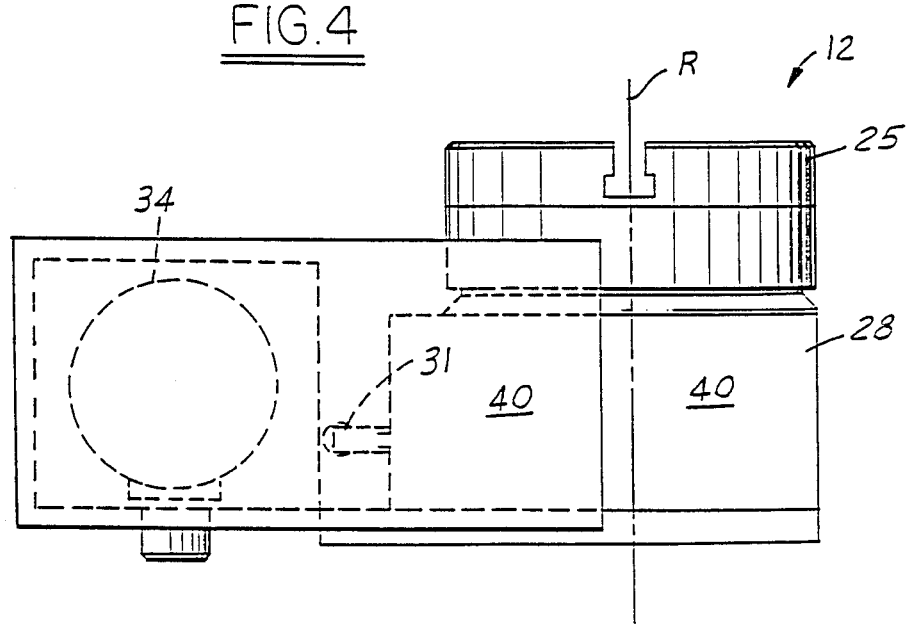

4,841,126

ROTARY TABLE WIRE EDM MACHINE

FIELD OF THE INVENTION

The present invention relates to electrical discharge machining and, more particularly, to positioning workpieces on work tables of traveling wire-type electrical discharge machines ("EDM machines") so that contoured parts may be accurately cut and shaped and finally finished from the workpieces. Still more particularly, the present invention relates to methods and apparatuses for automatically controlling the relative movement between the work tables and traveling wire electrodes of EDM machines.

BACKGROUND OF THE INVENTION

Electro-erosion machining of metal parts by electric discharge cutting or contouring is generally well-known. The process calls for juxtaposing a traveling, continuous wire-type electrode and a moving table or pair of tables on which a metal workpiece is mounted. A start hole is pre-drilled in the workpiece for threading the wire electrode. The wire travels from a supply reel so that new electrode wire surfaces are continually introduced to the erosion process. The table or tables move to continually position a metal workpiece, which is mounted on the table or tables, relative to the wire according to the progress of the process and the desired geometry for the finished part to be machined out of the workpiece, whereby electrical energy taking the form of successive electrical discharges between the moving wire and the workpiece is applied through a machining fluid constituted by a liquid dielectric. The electric energy removes material from the workpiece as the table or tables continually position the workpiece relative to the axially moving wire.

Conventionally, the workpiece is mounted or clamped to a work block on the work table or work tables of the standard wire EDM machine. Typically, programmable drives move the table or tables and workpiece along orthogonal axes, labeled "the X axis" and "the Y axis", to generate a machining path conforming to the desired contour shape. It is to be appreciated that the table or tables are capable of performing for both straight line motions and continuous path contouring. The workpieces are machined using power settings to achieve high metal removal rates. High speed machining, however, sacrifices both accuracy and surface finish.

Certain parts, for example, circular cams that are machined out of large plate or block workpieces, must be machined for highly accurate contours and exact surface finishes. Such precision machining is accomplished by re-machining the cut parts or "skim cutting" them several times to achieve a desired finished. But to skim cut, the workpiece must be held on the work table fixture or fixtures in its original position for the several passes. Where, as in some machines, the workpiece is clamped between two tables, the workpiece falls free when it is initially cut, virtually foreclosing the possibility of relocating and mounting the workpiece for secondary skim cutting.

To avoid this difficulty, it is a common practice to program the machining path so that parts of the workpiece will be left connected to the primary work block to form support bridges. Subsequent remachining or "skim cutting" can then be performed without the workpiece moving in relationship to the table axes. The connecting links may subsequently be cut with excess stock left on the workpiece to allow for finishing the bridge surface close to the "skim cut" part surface. This procedure, however, requires additional start holes to be pre-drilled within the workpiece to allow for rethreading the wire electrode on opposite sides of the support bridge.

Even avoiding this means of supporting a workpiece does not avoid the certain difficulties associated with controlling a workpiece along rectangular coordinates to approximate a circular path for cutting and contouring. Practice has revealed that complex components must be incorporated in programs for complex curves in the contours of workpieces. To simplify the programs, and thereby reduce the expense of man-hours needed to develop more complex programs, simple curves of the workpiece contours have been used to describe the path of motion between the electrodes and the workpieces. Simple curves, including circles, ellipses, parabolas, and the like, are themselves first order, straight-line approximations of circles, ellipses, parabolas, and the like, which then must be painfully combined into workpiece contours as second order approximations of the curves of the workpiece contours.

DESCRIPTION OF RELATED ART

Efforts have been made to use electronic control systems that simplify programming of curves of workpiece contours. The control systems disclosed in Swiss Pat. Applications Nos. 9594/70, BE 13 886 and 10 123/70, BE 13 887 by Ullmann et al. The Ullmann et al control systems were designed to meet the special problems associated with simplification of programming contour curves for electrical discharge machining applications.

U.S. Pat. No. 3,731,045, also issued to Ullmann et al., relates to a component that can be incorporated in the Ullmann et al control systems of the Swiss Pat. applications. The component incorporates an indexing unit which has a memory that stores information on rotating the system of rectangular coordinates for a simple curve. A computing circuit receives corrected information on the curve length and the information on the angle of rotation supplied by the memory so that it can calculate and supply information to match up several simple curves to thereby describe complex curves.

While the Ullmann et al. devices have simplified the programs for complex curves in the contours of workpieces, most of the simple curves on which these programs depend, including circles, ellipses, parabolas, and the like, still depend on a complexity of mathematic relations for rectangular coordinates that can itself be further simplified.

OBJECTS OF THE INVENTION

Accordingly, it is the primary object of the present invention to provide a method and apparatus for controlling the relative movement of at least one electrode of an EDM machine and at least one workpiece with respect to one another so as to describe a continuous curvilinear path.

Another object of the present invention is to provide a method and apparatus for controlling the relative motion between an electrode of an EDM machine and a workpiece to describe a continuous curvilinear path that is capable of being repeatedly followed to achieve high metal removal rates without sacrificing accuracy of the contour and the surface finish of a machined finished part.

Yet another object of the present invention is to provide a method and apparatus for controlling the relative motion between an electrode of an EDM machine and a workpiece to describe a continuous curvilinear cutting path that produces the highly accurate contours and exact surface finishes required for certain machine parts, as in the case of a circular cam that is machined out of a large plate or block workpiece by a process of "skim cutting" the workpiece several times to achieve a desired finish.

A related object of the present invention is to provide a work table on which a workpiece may be accurately held in its original position with respect to a cutting electrode for the several passes required by the process of "skim cutting" the workpiece several times to achieve a desired finish.

Still another related object of the present invention is to provide a rotary work table that may be used in combination with an EDM machine to accurately hold a workpiece in its original position for the several passes required by the process of "skim cutting" a workpiece to produce a rounded finished part, as for example, a circular cam.

SUMMARY OF THE INVENTION

In accordance with the invention, there is described an improvement in the method of programmatically controlling the relative movement between at least one electrode of an EDM machine and at least one workpiece. The relative movement includes at least one curve defined by information from a software program. The improvement is in several steps. One step calls for fixedly positioning the workpiece with respect to a reference axis. Another step calls for orienting the reference axis with respect to a home position. Still another step calls for receiving information from the software program regarding an angle to which the reference axis is to be rotated with respect to the home position. Yet another step calls for rotating the reference axis and the workpiece about a rotation axis until the reference axis is aligned at the angle position. Another step calls for resetting the reference axis to the home position. A further step calls for repeating the previously described steps. Still further steps may include translating either the electrode or the workpiece along a translation axis, receiving information from the software regarding compensations in the path of relative movement between the electrode and the workpiece and compensations in power settings, and repeating all the steps while accommodating the path and power compensations to achieve the desired results of skim cutting.

Also in accordance with the invention, a rotary table assembly is adapted to carry out the steps of the improvement in the method as described. Rotation of the table achieves relative movement between at least one electrode and a workpiece to describe a path for producing a desired contour of a workpiece. The table provides a means for rotating the workpiece about an axis of rotation to an orientation in which the electrode is coincidental with the workpiece at a point on the path. Accordingly, the table is a part of a combination that in one embodiment of the invention also comprises a means for providing a certain distance between at least one electrode and an axis of rotation by translating the table to provide for a distance corresponding to the distance between a point on the path and the axis of rotation. This latter means may alternatively be a part of a mechanism for advancing the electrode, rather than the table, along an axis of translation.

Because the rotary table assembly is to be used in an environment in which a dielectric fluid is to be directed, by nozzles, to the workpiece supported on the table, which will result in the table and its fixtures being splashed and sprayed by the fluid, all externally exposed details of the table assembly are protected by electroless nickel plating, and sensitive parts are protected by splash guards of the same plating. Alternatively, these parts may be fabricated from stainless steel. In either case, internal parts are isolated from the dielectric fluid by wiper seals and an air pressurization system.

BRIEF DESCRIPTION OF THE DRAWINGS

Other objects and advantages of the invention will become apparent upon reading the following detailed description and upon reference to the drawings, in which:

FIG. 3 is a side sectional view of the rotary table taken along line 3—3 of FIG. 1;

FIG. 4 is a side elevational view of the rotary table shown in FIGS. 1—3;

While the invention will be described in connection with a preferred embodiment and method, it will be understood that it is not intended to limit the invention to that embodiment and method. On the contrary, it is intended to cover all the alternatives, modifications and equivalents as may be included within the spirit and scope of the invention as defined by the appended claims.

DETAILED DESCRIPTION OF THE INVENTION

Figure 1:
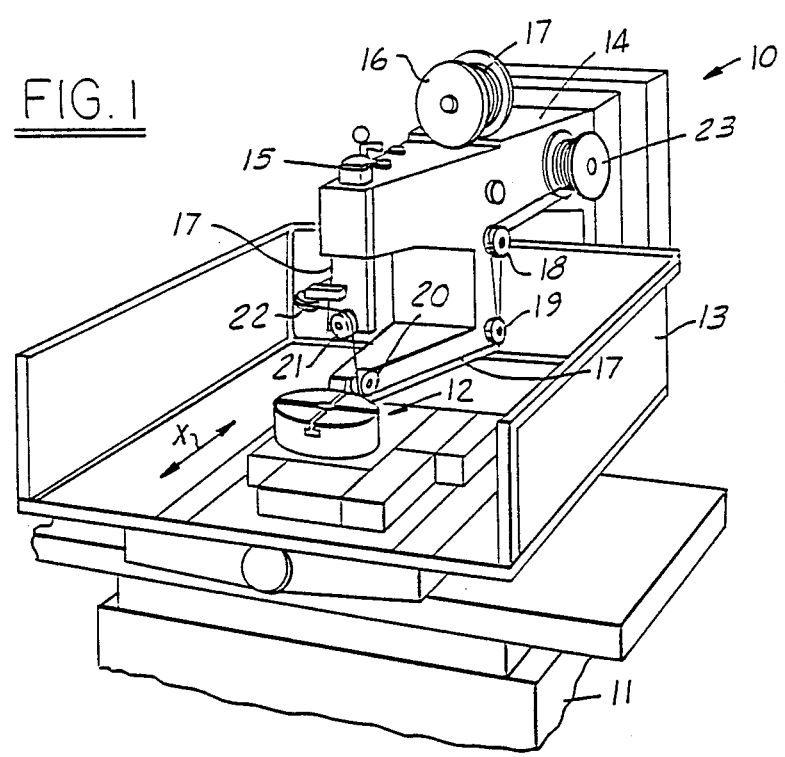
FIG. 1 is a partial front perspective view of a machine tool and rotary table for an EDM machine incorporating one embodiment of the present invention.

Referring first to FIG. 1, there is shown an EDM machine, indicated generally by the numeral 10. The EDM machine includes a base 11 which may have a dielectric fluid reservoir and a dielectric fluid temperature control unit built into it. Both are for handling a dielectric fluid used in the EDM operation, so that the dielectric fluid, reservoir, and temperature control unit together form a dielectric system. Those skilled in the art are aware that the dielectric system need not be an integral part of the machine base. In fact, many of those skilled in the art would prefer the known system of a separate dielectric tank located adjacent to the machine because of its convenience in maintenance and servicing.

The dielectric fluid may be either a deionized water supply or, alternatively, kerosene or a like light cutting oil. Throughout the cutting operation, a stream of dielectric fluid is continuously directed at an electrode wire 17 and a workpiece situated on a rotary table top 25, as for example the workpiece 26 which will be discussed later as situated on table top 25 of FIG. 2, to maintain flow around the gap between the electrode and the workpiece, from either or from both upper and lower directions. The invention includes means to protect against this potentially corrosive condition to parts of the EDM machine by means also to be later explained.

The table top 25 is included in a rotary table assembly 12, which is an improvement to the EDM machine 10. Typically, workpiece tables for EDM machines have programmable travel tables along axes orthogonal to each other, usually labeled the X and Y axes. Associated with movement along the X and Y axes are X and Y table drives, not shown. In accordance with the present invention, the rotary table assembly 12 has a programmable travel along the X axis, with the unused table drive, that conventionally would be the Y table drive, being used to power and control rotation of the table top 25 as will be discussed later. Plastic removable shields, fashioned as a four-sided work pan 13, surround a work area to contain the dielectric fluid.

A machine column is indicated generally by the numeral 14 and includes a height adjustment head 15 which is adjustable through an associated precision rack and gear arrangement to bring a wire guide system close to the workpiece to maintain accuracy.

The wire guide system includes a supply reel 16 from which the electrode wire 17 unwinds. The electrode 17 is illustrated as being a wire configuration, but the electrode 17 may alternatively be a band electrode with known and appropriate changes being made in the configuration of the associated guide and drive rollers. Guide rollers 18, 19, 20, 21, 22 are included in the system to carry the wire electrode 17 through a predetermined wire travel path to a take-up roll 23. New wire 17 from the supply reel 16 to the guide rollers 18, 19, 20, 21, 22 is fed downwardly from the top to conveniently facilitate threading the wire 17 through the guides 18, 19, 20, 21, 22 and through the workpiece when there is a breakage during machining.

The wire guide system preferably includes a variable tension brake assembly (not shown) with a precisely controllable tension adjust system including switches. The system preferred is known in the art as a variable tension device using D.C. current to magnetize powered metal particles as the braking media. Tension is set by switches operating an up/down digital signal control. A constant tension is maintained on the electrode wire 17 by the brake assembly.

Figure 2:
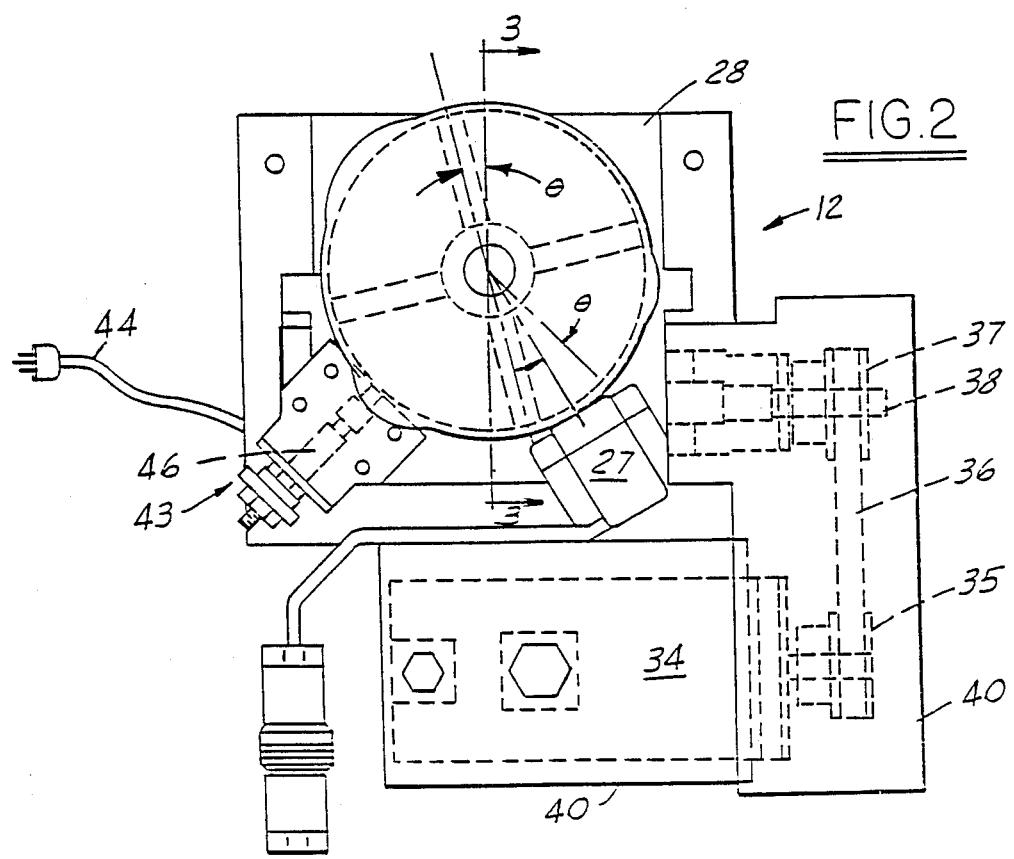
FIG. 2 is a top view of the rotary table shown in FIG. 1.

Referring now to FIG. 2, it is seen that the rotary table assembly 12 includes a rotary table 24 that includes the rotary table top 25, on which a workpiece, here a rotary cam 26, is situated. The table top 25 is rotatable clockwise or counterclockwise with respect to a reference axis X—X, shown in this embodiment to pass through the axis of rotation R—R (see FIG. 3) of table top 25. In FIG. 2, the table is shown to have rotated through an angle $\theta$, which is the angle between axis X—X and a reference line A—A. Accordingly, the angle $\theta$ represents the angle through which the table has rotated from an indexing position in which the reference line A—A is aligned with the X axis.

An initial position, in which reference line A—A is aligned with the X axis, is indexed by a home switch assembly 27. The home switch 27, which is a cam-operated limit switch, serves to indicated that the table top is close to the home position. A true home position is electronically preset into a D.C. motor control system 111 and 105 (FIG. 5) and 34 (FIGS. 2 and 4), by a home position set switch (not shown). The rotary table is under closed loop position control and will return to its precise home position from any rotational angle $\theta$ away from the preset home position, either by program control or by a manually-operated home switch.

Referring now to FIG. 3 in addition to FIG. 2, it is seen that the table 24 extends downwardly into a table base 28. Table 24 is supported for rotation in base 28 by retainer ball bearing assemblies 30. As can be seen, table bearing assemblies 30 are protected by shield 29. Shield 29 also provides a contact ring for a D.C. power brush assembly 43.

The D.C. power brush assembly 43 is an integral part of the EDM table operation. By its very juxtaposition to the rotary table 24, it provides a novel means of supplying polarity to the workpiece. Other means would pose problems because of the dynamics and structure of the rotary table assembly 12. For one example, if the positive polarity of the D.C. machining power were connected directly to the workpiece, the cable connection might become entangled as a result of the rotary motion. For another, if the positive polarity of the D.C. machining power were connected to the table base 28, the machining current passing through the base 28 might result in a failure of bearing parts within the base 28.

The power brush assembly 43 supplies power to the workpiece via a spring-loaded brass shaft 46, indicated in phantom in FIG. 2, which contacts the contact ring 29, shown in FIG. 3. The spring-loaded shaft 46 is electrically energized by means known to those skilled in the art via a cable 44, which is adapted to be connected to a conventional plug-in power source.

Table 12 may be optionally designed for additional support by an air bearing which operates by pressurized air introduced into the base 28 through a connector fitting 31. By this option, air introduced to the base 28 would pressurize the spaces between the table structure 25 and the base 28 to support the table 24 with table top 25 within the base 28. In the preferred embodiment, however, the connector fitting 31 provides pressurized lubricated air to the table base to prevent fluid from entering the base housing. Air is supplied by conventional means, not shown, including an air filter, an air regulator and an air lubricator, with the latter means providing atomized lubrication to the rotary table assembly. A press ball bearing assembly 32 contains the table top 25 within the base 28. An axial preload on the table assembly 12 is set by spacers (not shown) between a pack hub 33 and the table top 25 and the inner race of ball bearing assembly 32.

Still referring to FIGS. 2 and 3, the rotary table 25 is driven by a DC servo motor and encoder 34. As is well-known, the DC motor can be very accurately controlled by the application of a variable voltage. The motor drives a pulley 35 which, in turn, drives a belt 36 causing a table pulley 37 to rotate concomitantly. Table pulley 37 is received around a worm shaft 38. Accordingly, rotation of the table pulley 37 rotates worm shaft 38. As can be seen in FIG. 3, worm shaft 38 engages the threads of a worm gear 39 connected to table 25. Rotation of the worm shaft 38, then, causes worm gear 39 and table 25 to rotate. These linkages of rotating pulleys and shafts connects table 24 to motor 34 so that rotation of table 24 and table top 25 is in direct response to the motor.

As should have been anticipated by the earlier discussion regarding splashing of the dielectric fluid, the invention has a means of protecting moving parts of the rotary table assembly 12. According to this aspect of the invention, splash plates or guards 40 are provided to keep the dielectric fluid from splashing upon critical parts of the rotary table assembly 12, including the D.C. motor and encoder 34. Also, all parts of the assembly that might be subjected to splashing by the dielectric fluid are preferably protected by nickel plating or are fabricated from stainless steel.

Control of the rotary table 25, as it cooperates in producing relative movement between the electrode 17 and the workpiece 26, including relative translation along the X—X axis, will now be explained with reference to FIG. 5. Information is fed by conventional means into a control system that includes input devices 100, a memory 108, a central processing unit (CPU) 109, and output devices 110, all of which lead to resulting operations of operating devices 113, 114.

Figure 5:
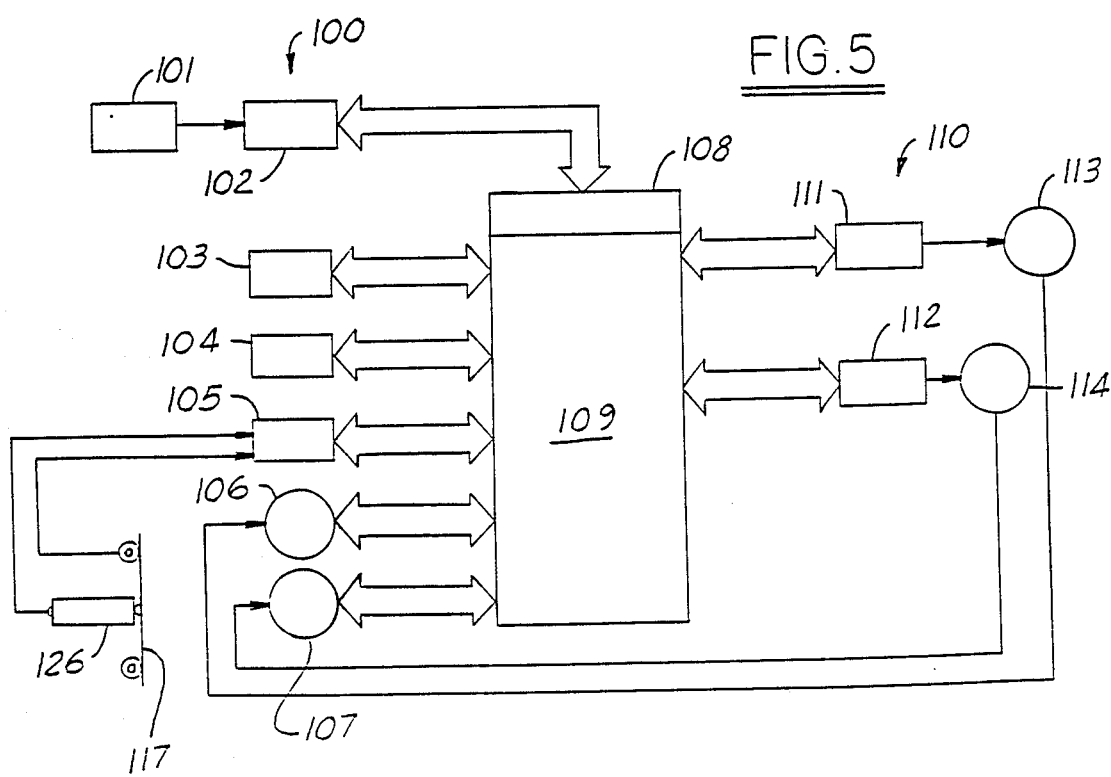
FIG. 5 is a block diagram of a programmable controller for a rotary table EDM machine.

Typical input devices for use in the system that controls the invention are generally indicated to the right of FIG. 5 by the numeral 100. Software is stored on an information carrier 101 as, for example, a magnetic disk or tape. Recorded in the software are the characteristic points on a path which the workpiece is called upon to travel with respect to the electrode 117 to describe a desired cutting path in the workpiece. Characteristic points include the starting and end points of a curve.

The information carrier 101 is fed into an information controller 102, preferably a magnetic media controller as, for example, a disk or cassette reader. Other information, such as variables which adapt the software program to a particular application, may be fed into the system via a keyboard or pushbuttons at an operator's station 103. Still other information may be fed into the system by discrete machine based input devices 104, such as limit switches or the like. Particular information, highly pertinent to the EDM operation, regarding the positioning feed rate of the workpiece with respect to the wire electrode is also fed into the system via a feed rate control 105. Finally, encoding devices 106, 107, one of which is included in the servo motor and encoder 34, input information into the system as a feedback of the output by motors electrically linked to the encoder devices.

Input signals are bussed to the CPU 109 and memory 108 for the information to be processed by the CPU 109 or stored in the memory 108. Information stored in the memory 108 will be later sent to the CPU 109 to be processed, and information processed by the CPU may be sent to memory 108 for later return for further processing by the CPU 109. The CPU 109 processes the information into characteristic points on the path of the X—X axis with respect to the angular rotation of table 25. This includes whether the path is traversed for the first time or whether it is a secondary pass for skim cutting, with regard to whether the table is reset to the home position. In this process, the width of the operating gap between the electrode 117 and the workpiece 126 is to be considered. It should be appreciated that operations which result in rotation of table top 25 and linear translation of the electrode wire 17 relative to table top 25 progress according to stored program data and a closed loop positioning control, as would be the case of X and Y operations which would result in standard X—Y wirecut EDM known to those of ordinary skill in the EDM technology. Accordingly, the feed rate of the positioning servo system is regulated by a feed rate control 105, which monitors the machining gap voltage developed between the wire electrode 117 and the workpiece 126, both schematically represented to the right of FIG. 5.

The characteristic points of the workpiece contour supplied to the information carrier differ from the curve path of relative movement between the workpiece 126 and the wire electrode 117. Compensation must accordingly be made in the wire path and power settings when the program is recalled for skim cutting. Also, it should be noted that the programmed position of the axis along which the electrode is guided will have to be altered according to a desired cam profile. When the profile angle is other than 0 degrees, the true position of the wire path from the table rotating axis must increase in relationship to the profile angle to compensate for the change in the true contact point between the wire electrode and the cam profile. Output signals are bussed to output devices 111, 112, from which the signals pass to result in the relative movement of electrode 117 and workpiece 126, of which the driving motors 113, 114 rotate and displace, respectively, the moving parts of table system 12. The wire electrode 117 describes the curve path and cuts the curve portion from the workpiece 126 as per the data supplied by the software.

The encoder 106, which is included in the motor and encoder 34, monitors the rotation of table top 25 to feed back this information into the CPU 109 for further processing. In this manner, the encoder 106 attached to the motor 113, which is the motor of the combined motor and encoder 34 referred to earlier as rotating table 24, and the encoder 107 attached to the motor 112 for relative translation between the electrode 117 and the workpiece 126 along the X—X axis convert the output signals to represent the characteristic points of the curve path of the workpiece contour.

Figure 6:
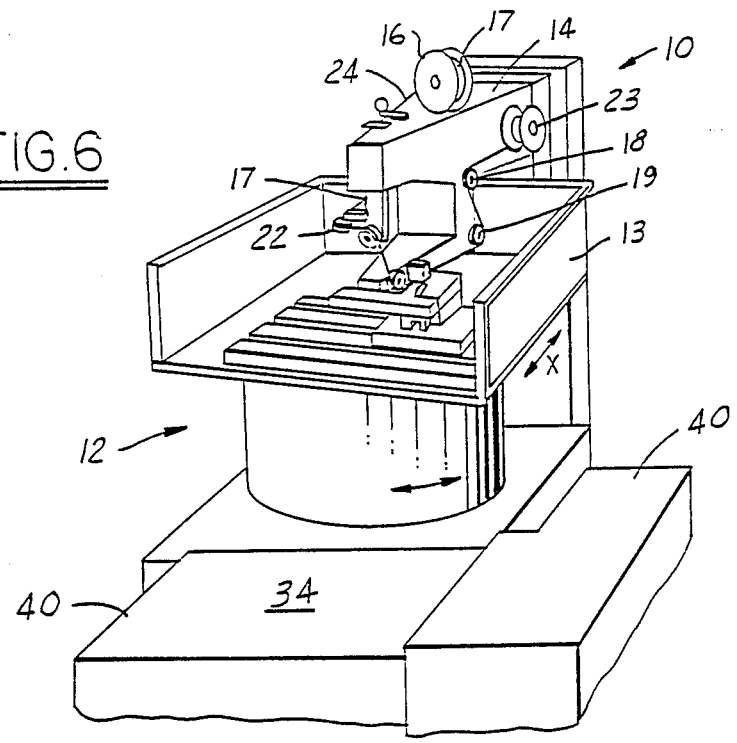
FIG. 6 is a partial front perspective view of a machine tool and rotary table for an EDM machine incorporating another embodiment of the invention.

The invention as described and shown in the figures of the drawings provides a convenient means of programming the relative movement of the wire electrode 17 and the workpiece 26 on polar coordinates. Various changes and modifications may be made within the inventive concept without departing from the spirit of the invention. For example, in the preferred embodiment, the table is shown in FIG. 2 as being translated along the X—X axis for relative movement between the electrode 17 and the work table assembly 25. It is known in the art that the electrode itself may be translated relative to the work table. Thus, it is contemplated that an embodiment of the invention as shown in FIG. 6 might provide for translation of the electrode 17 along the X—X axis, as for example by translating the machine column 14 to provide for the same relative motions between the electrode 17 and the work table assembly 25 as when the rotary table is translated. It should be appreciated that a work table 41, with a clamp 42 for holding the workpiece 26 thereon, might be provided within the work pan 13 when the work pan is rotated on the work table 25 in the embodiment of FIG. 6.

I claim:

1. A method of controlling relative movement between at least one electrode of an EDM machine and at least one workpiece, which relative movement follows a continuous curvilinear path capable of producing a desired contour of a workpiece, the method comprising the steps of:
    (a) positioning each point on the curvilinear path by the distance of said each point from an axis of rotation;

(b) providing a rotary table having an axis of rotation, said rotary table having contact ring means associated therewith, said contact ring means encircling said rotary table;

(c) mounting the workpiece on the rotary table;

(d) rotating the workpiece about the axis of rotation;

(e) positioning each point on the curvilinear path by the angle through which the workpiece is rotated with respect to a reference axis, the reference axis intersecting the axis of rotation; and (f) providing a D.C. brush assembly, and supplying polarity to the workpiece via said D.C. brush assembly and said contact ring means.

2. The method defined in claim 1, wherein the distance of said each point from the axis of rotation is taken in a plane perpendicular to the axis of rotation.

3. The method defined in claim 2, wherein the step of positioning each point on the curvilinear path by the distance of said each point from an axis of rotation includes translating said at least one electrode to said each point.

4. The method defined in claim 3, wherein said at least one electrode is translated along a translation axis that intersects the axis of rotation.

5. The method defined in claim 4, wherein the translation axis is the reference axis.

6. The method defined in claim 1, wherein step (a) is performed before steps (d) and (e).

7. The method defined in claim 1, wherein steps (d) and (e) are performed concurrently.

8. The method defined in claim 1, further comprising the step of (g) memorizing the position of each point on the curvilinear path.

9. The method defined in claim 8, further comprising the step of repeating steps (a), (d) and (e).

10. In an EDM machine in which relative movement between at least one electrode of the EDM machine and a workpiece describe a path for producing a desired contour of a workpiece, the combination comprising:

translation means for providing a distance between the at least one electrode and an axis of rotation, the distance corresponding to the distance between a point on the path and the axis of rotation;

rotation means including a rotary table on which the workpiece is mountable for rotating the workpiece about the axis of rotation to an orientation in which the electrode is coincidental with the workpiece at a point on the path, said rotation means having a contact ring associated therewith; and polarity means including a d.c. brush assembly for supplying polarity to the workpiece via said contact ring when the workpiece is mounted on the rotary table.

11. The combination according to claim 10, further comprising splash guard means for protecting the rotation means against splashing by a dielectric fluid.

12. The combination according to claim 10, wherein the contact ring contiguously encircles the rotary table.

13. The combination of claim 12 wherein the D.C. brush assembly is mounted adjacent the rotary table, the D.C. brush assembly including a contacting member spring-biased into contact with the contacting ring.

14. In an electro-eroding machine in which relative movement between at least one electrode of an electro-eroding machine and a workpiece describe a path for producing a desired contour of a workpiece, the combination comprising:

a rotating work table including a table top and a contact ring encircling and depending downwardly from the table top;

a base in which said table is rotatably supported;

a D.C. brush assembly mounted on the base adjacent the rotating table, the D.C. brush assembly electrically contacting the contact ring to polarize a workpiece mounted on the table top;

a servo motor and encoder assembly capable of rotating said table through a desired angle;

rotatable drive linking means connecting said motor and encoder assembly to said rotatable table; and means protecting said motor and encoder and said linking drive means from a liquid dielectric splashed about said rotating table, base, servo motor and encoder, and linking rotatable drive means.

15. An improvement in the method of programmatically controlling the relative movement between at least one electrode of an EDM machine and at least one workpiece, whereby the relative movement includes at least one curve within a plane, the curve being defined by information from a software program, the improvement comprising the steps of:

(a) positioning each point on the curve by the distance within the plane of said point from an axis of rotation;

(b) providing a rotary table having an axis of rotation, said step of providing a rotary table including providing a contact ring encircling said rotary table;

(c) mounting the workpiece on the rotary table;

(d) rotating the workpiece about the axis of rotation;

(e) positioning each point on the curve by the angle through which the workpiece is rotated with respect to a reference axis within the plane, the reference axis intersecting the axis of rotation;

(f) memorizing the position of each point on the curve;

(g) providing a brush assembly;

(h) supplying polarity to said workpiece via said brush assembly and said contact ring to create and maintain a voltage gap between said one electrode and said workpiece; and (i) repeating steps (a), (d) and (e).

16. The method defined in claim 15, wherein the step of positioning each point on the curve by the distance of said point from the axis of rotation includes translating the axis of rotation with respect to said at least one electrode.

17. The method defined in claim 15, wherein the step of positioning each point on the curve by the distance of said point from the axis of rotation includes translating said at least one electrode to said each point.

* * * * *